US009281688B2

(12) United States Patent  (10) Patent No.: US 9,281,688 B2
Hardin  (45) Date of Patent: Mar. 8, 2016

(54) ENERGY MANAGEMENT SYSTEM FOR MULTIPLE POWER INPUTS

(71) Applicant: Bradley Hardin, Solana Beach, CA (US)

(72) Inventor: Bradley Hardin, Solana Beach, CA (US)

( * ) Notice: Subject to any disclaimer, the term of this patent is extended or adjusted under 35 U.S.C. 154(b) by 338 days.

(21) Appl. No.: 13/767,782

(22) Filed: Feb. 14, 2013

(65) Prior Publication Data

US 2014/0229030 A1    Aug. 14, 2014

(51) Int. Cl.
*G06F 19/00*    (2011.01)
*H02J 3/00*    (2006.01)

(52) U.S. Cl.
CPC ...................... *H02J 3/005* (2013.01)

(58) Field of Classification Search
CPC .................... H02J 3/00; H02J 3/005
USPC .......................................... 700/295
See application file for complete search history.

(56) References Cited

U.S. PATENT DOCUMENTS

| | | | |
|---|---|---|---|
| 2003/0078797 A1* | 4/2003 | Kanbara et al. ............ | 705/1 |
| 2010/0328023 A1* | 12/2010 | Thomson ................. | 340/3.1 |
| 2011/0062888 A1* | 3/2011 | Bondy et al. .............. | 315/294 |
| 2011/0258112 A1* | 10/2011 | Eder et al. ................ | 705/39 |
| 2012/0053739 A1* | 3/2012 | Brian et al. ............... | 700/287 |
| 2013/0039104 A1* | 2/2013 | Sharma .................... | 363/123 |
| 2013/0264870 A1* | 10/2013 | Keysar et al. ............. | 307/24 |
| 2014/0049886 A1* | 2/2014 | Lee et al. ................. | 361/679.01 |
| 2014/0229030 A1* | 8/2014 | Hardin .................... | 700/295 |
| 2014/0265585 A1* | 9/2014 | Della Sera et al. ......... | 307/52 |

OTHER PUBLICATIONS

Pickard, William F., Amy Q. Shen, and Nicholas J. Hansing. "Parking the power: strategies and physical limitations for bulk energy storage in supply—demand matching on a grid whose input power is provided by intermittent sources." Renewable and Sustainable Energy Reviews 13.8 (2009): 1934-1945.*
Svehla, Katalin M. A Specification for Measuring Domestic Energy Demand Profiles. Diss. Master thesis, University of Strathclyde, 2011.*
Askin, Amanda. An Advanced Strategy for Energy Efficient Lighting Incorporating Distributed Sensing and Tailored Controls. Diss. Stanford University, 2011.*

* cited by examiner

*Primary Examiner* — Michael D Masinick
(74) *Attorney, Agent, or Firm* — Buche & Associates, P.C.; John K. Buche

(57) ABSTRACT

In general, described is an energy management system for controlling multiple input streams of electricity to a local power system. Preferably, input streams are prioritized by computer algorithms for use or output within the local power system. Suitably, high priority streams are directed by the computer software to primary outputs while lesser priority streams are directed to secondary outputs.

13 Claims, 2 Drawing Sheets

ENERGY MANAGEMENT SYSTEM FOR MULTIPLE POWER INPUTS

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of Invention

This application is in the field of systems for managing or optimizing the distribution of multiple streams of generated electrical energy from a plurality of sources. More specifically, this application is in the field of systems for monitoring a plurality of generated electrical energy input streams and optimizing said streams so that output of an electrical energy stream with a predetermined kilowatt-hour magnitude can be accomplished.

2. Background of the Invention

Frequently, local electrical power systems have multiple options for alternative input streams of electricity to the public utility power grid. For example, a local power system may have an input streams originated by any of non-publically generated electricity from solar generated power, wind generated power, fuel-cell power, geothermal generated power, fossil-fuel generated power, or steam generated power. Power or energy management systems are known which measure and control the overall output of electricity from all of the inputs to within the local system wherein, if the collective input from the alternative sources is not sufficient to meet the overall demands of the local system, power is drawn from the public utility-power grid. In summary, there are a number of single energy input monitoring systems which focus on measuring the users end of the energy used. However, no devices are known which measure, optimize and distribute power generation from multiple sources. A need therefore exists for an energy management device that can manage and pull from the prioritized energy generation sources. By prioritizing alternative energy sources, lower negative environmental impacts, reductions in carbon footprints, and promotion of the use of multiple sources of alternative energy for use in the public and private sectors may be accomplished.

SUMMARY OF THE INVENTION

In view of the foregoing, it is an objective of this disclosure to describe an energy management system for controlling multiple input streams of electricity to a local power system. In one embodiment, the multiple input streams of electricity may be originated by any electricity stream from solar generated power, wind generated power, fuel-cell power, geothermal generated power, fossil-fuel generated power, steam generated power, or the public utility power grid. Preferably, power streams are provided to the system and prioritized by computer algorithm for use or output within the local power system, wherein high priority streams are directed by the computer software to primary outputs while the remaining lesser priority streams are directed to secondary outputs (e.g., provided to battery storage (usually an array of batteries), returned or sold to the public-utility power grid, or unused).

In one embodiment of the controls, an initial priority of input streams may be pre-programmed. Via the computer hardware and a control algorithm, input stream priorities may change depending on system demands. In one embodiment, the power management system is pre-programmed with minimum power requirements for primary outputs so that, after measuring the magnitude of a high priority input stream, if the magnitude of the input stream is less than the minimum power requirement for the primary output, then the priority of the input stream is reduced by the computer algorithm so that another input stream may be measured and its magnitude evaluated against the minimum power requirements of the primary outputs. Suitably, the process may be repeated until a power stream of sufficient magnitude for the primary output is identified and directed to the primary output. Lower priority input streams are suitably directed to secondary outputs such as smaller back-up battery banks or returned to the public utility grid.

Other objectives and desires may become apparent to one of skill in the art after reading the below disclosure and viewing the associated figures.

BRIEF DESCRIPTION OF THE FIGURES

The manner in which these objectives and other desirable characteristics can be obtained is explained in the following description and attached figures in which.

It is to be noted, however, that the appended figures illustrate only typical embodiments of the disclosed management systems, and therefore, are not to be considered limiting of their scope, for the disclosed systems may admit to other equally effective embodiments that will be appreciated by those reasonably skilled in the relevant arts. Also, figures are not necessarily made to scale.

DETAILED DESCRIPTION OF PREFERRED EMBODIMENTS

In general, described is an energy management system for controlling multiple input streams of electricity to a local power system. Preferably, input streams are prioritized by computer algorithm for use or output within the local power system. Suitably, high priority streams are directed by the computer software to primary outputs while lesser priority streams are directed to secondary outputs. The more specific aspects of the system are best disclosed with reference to the attached drawings.

Figure 1:
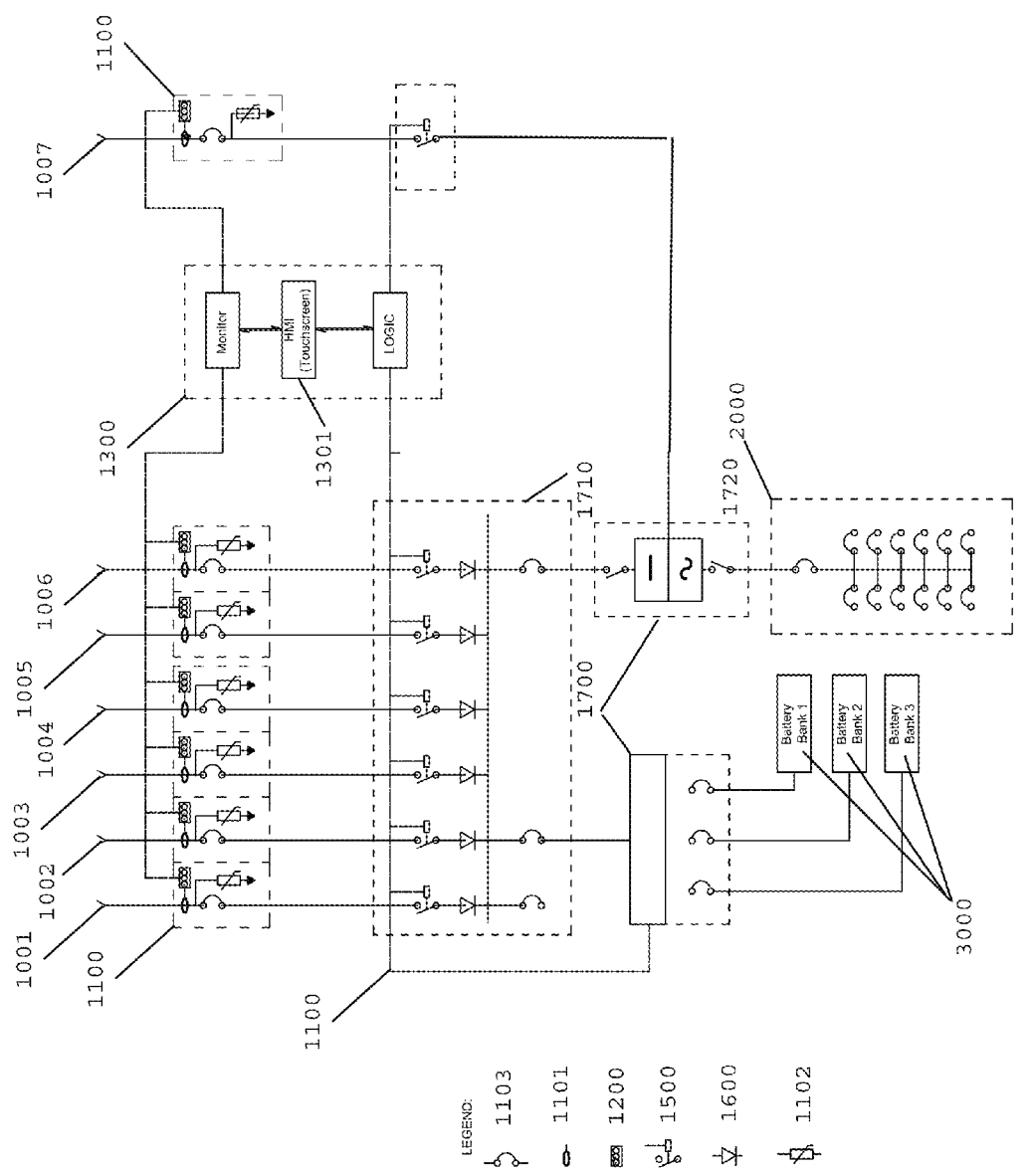
FIG. 1 is a single line diagram of the wiring, controls and devices that make up the Energy Management System; and, FIG. 2 is a schematic axonometric of the two devices that house the wiring, controls and devices that make up the Energy Management System.

FIG. 1 is a single line diagram of the wiring, controls, and devices that compose the disclosed energy management system 1000. As shown, the disclosed system 1000 features seven input streams 1001, 1002, 1003, 1004, 1005, 1006, and 1007 (collectively "streams 1010"). In one embodiment, the multiple input streams of electricity may be originated by any electricity stream from (1) solar generated power, (2) wind generated power, (3) power stored in fuel-cells, (4) geothermal generated power, (5) fossil-fuel generated power, (6) steam generated power, or (7) the public utility power grid. Suitably, the input streams may be provided to a source collection box 1100. Preferably, the collection box 1100 may separately collect either direct or alternating current loads from the input streams 1010. While within the collection box 1100, the input streams 1010 are provided through separate current transformers 1101, via independent circuits, that are coupled to power monitoring meters 1200 for measurement of the streams' power magnitude in watts, volts, and amperes. The streams 1010 from the current transformers 1101 are individually fed through surge protected 1102 circuit breakers 1103 to a production meter 1400.

Still referring to FIG. 1, measurements from the power monitoring meters 1200 are suitably provided to a central processing unit (CPU) 1300. The CPU 1300 is configured with computer readable memory loaded with computer programming modules for executing various algorithms and controlling hardware. Suitably, a first module is configured with an initial priority of the input streams 1010 and a minimum power requirement for a primary output. The first module is further configured with the following logic: IF the highest priority stream has a magnitude that is less than the power requirement of the primary output, THEN reduce the priority of the stream and start over, ELSE deliver the highest priority stream to the primary output and deliver the lower priority streams to the secondary outputs. In another embodiment, the CPU 1300 may have hardware 1301 (e.g., a touch screen) for controlling the computer. In some cases, the CPU 1300 may be programmed so that multiple streams may be combined to provide the required power magnitude for a primary output.

Yet still referring to FIG. 1, the CPU 1300 controls distribution of the streams 1010 via a remote controlled charging gate switch 1500, wherein a switch on each stream 1001, 1002, 1003, 1004, 1005, 1006, 1007 is opened to the primary output, the secondary output, or closed. Preferably, the gate controller switch 1500 acts as a computer controlled switch that may either allow the power being produced in any one of the streams 110 to feed into one or more of the desired primary or secondary outputs, e.g., energy storage devices. Alternatively, if the power being provided by any one of the streams 110 is less than the desired input, is nil, or is close to nil, then the system input from such stream is interrupted (i.e., the gate 1500 is opened), grounded and prevented from input into the primary outputs until the stream provides sufficient power or is determined to be at a higher preference in the user applied list of input sources.

Referring still to FIG. 1, in one embodiment, the streams 1010 from the gate controller switch 1500 are provided to a charge output controller 1700. Suitably, the charge output controller 1700 may be configured to deliver direct or alternating current (via a DC panel 1710 or AC inverter 1720) to the primary output 2000. The system may be designed, so that multiple streams of primary outputs are either provided to a battery bank 3000 such as a lithium ion bank or other energy storage device or an electrical feed back to the utility grid as it is either available or able to be pushed through a net meter device. In a preferred embodiment, High current diodes 1600 may suitably be provided in between the charging gate switch 1500 and the output controller 1700. Typically, a back surge protector may be employed to prevent the electricity streams 1010 from flowing backward in the event of a malfunction of the output controller 1700.

Figure 2:
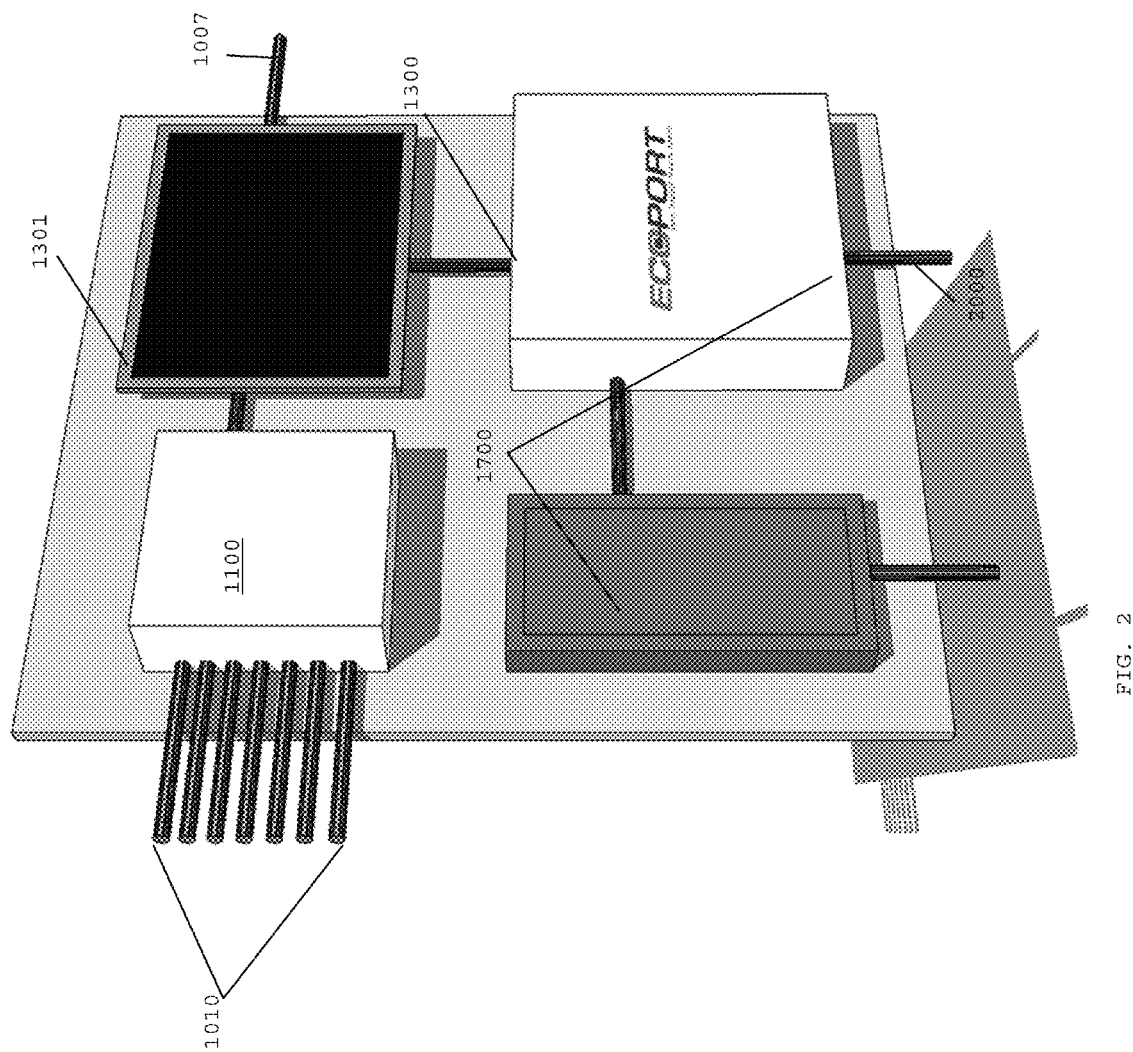

FIG. 2 is a schematic axonometric of the control components of the system. As illustrated in FIG. 2, the system may be modular and self-contained energy collection and distribution system that is to be surface mounted in proximity to traditional electrical fuse boxes or other electrical sources of input. The product may be comprised of, but is not limited to, any of the following fire resistant and electrical code compliant materials: 100% recycled HDPE; partially recycled HDPE; extruded corn based plastic; fire resistant plastic; or other fire resistant and code compliant material.

In operation, the system effectively acts as a measurement and distribution device. Technically, there is no limitation on the amount of energy that may be input into the system. Practically, the electrical cable, power gates and device must be sized to appropriately allow for the desired input and output through the system. In other words, different embodiments of the present application with varying sizes and specifications, including custom sized devices to accommodate both small input and output systems as well as large input and output systems, are contemplated without altering the core functions of the present invention. Furthermore, the system may be designed to meet varying electrical geographic requirements as is native to that region.

Referring to FIGS. 1 and 2, the inputs 1010 may be divided into renewable streams (1001-1006) and the power grid 1007. The input streams (1001-1006) preferably flow as shown in FIG. 1 and in the present embodiment, the primary output 2000 is a distribution board and the secondary output is a battery storage 3000. It should be noted that only alternative energy sources (1001-1006) are provided to the primary output 2000 (i.e., power grid 1007 is disconnected) unless the said sources (1001-1006) do not possess the predetermined power requirements. In those instances, said sources (1001-1006) are provided to the secondary output while the power grid 1007 is provided to the primary output 2000.

General Example:

In one local system, which has a solar, wind and geothermal power inputs plus the public power grid, a user may prioritize the power inputs so that the energy management system pulls from the solar first, wind second, geothermal third and grid power as a last resort. The energy management system will then monitor and control each input stream to verify that electricity from the inputs are meeting the required minimum power requirements for the primary output. For instance, if the system is programmed to take a minimum kWh of 8.0 from the highest priority inputs, e.g., solar, and the highest priority input system drops below the required 8.0, then the system switches to the next highest priority input, e.g., wind. In the above instance, the formally highest priority input switches to a secondary or tertiary output. The system will continually monitor the highest priority inputs to ensure that the minimum output is met.

Specific Example:

A trailer located at a construction site has four available power sources, namely, solar power, wind power, geothermal power, and the public power grid. When fitted with the disclosed power management system, the CPU of the power system is provided with: (1) the minimum power requirements for operating the trailer; and (2) the solar power being highest priority, wind power being second highest priority, geothermal power as third highest priority and the public power grid being the lowest priority. Initially, solar power will be used to power the trailer operations, while wind and geothermal are provided to battery backup. If the solar power is not able to provide a sufficient amount of energy for powering trailer operations, then the power management system will deprioritize the solar power and run the trailer operations off of wind power while solar and geothermal are directed to the battery backup. The process will be continually monitored so that the trailer is always operational.

It should be noted that there are two customizations that allow the system to be optimized. First is the energy input priority stream. Second are the minimum requirements for the primary outputs. The battery charging array will be in series and parallel allowing for the most productive charging to be achieved. Smaller "mini-arrays" may be split from the main array for redundant power storage. This solution is recommended for system inputs with more than two sources of power generation.

In summary, the energy management system is composed of three major components with supporting equipment, wiring and switches. The first component is defined by seven input watt monitoring devices that feed to the computerized charge controller device. The charge controlling computer is the second major component that takes the seven watt meter readings and applies the pre-programmed priority and production algorithm before controlling the correct distributions to the output switch device. Suitably, the output switch device toggles the charges to the power storage components, such as a gel type deep cycle battery or a lithium ion battery bank. In one embodiment, the output switch allows a constant power feed to the energy storage system and is controlled by the charge controlling computer.

The disclosed sighting system may be constructed of any suitable materials and methodologies known for controlled local power systems. It should be noted that FIGS. 1 through 3 and the associated description are of illustrative importance only. In other words, the depiction and descriptions of the present disclosure should not be construed as limiting of the subject matter in this application. Additional modifications may become apparent to one skilled in the art after reading this disclosure.

I claim:

1. An energy management system comprising:
a plurality of wire(s) coupled respectively to a corresponding plurality of electrical inputs;
a wattmeter that is independently circuited to each of said wire(s);
a gate switch for independently controlling flow of electricity through each wire; and,
a computer with computer hardware coupled to computer readable memory with program code configured to: (a) Identify a priority relationship between the wires, (b) Identify a minimum electricity requirement for the highest priority wire, (c) Receive measurements from the wattmeter, (d) Determine whether the highest priority wire meets the minimum electricity requirement and, if so, control the gate switch to allow electricity to pass through said highest priority wire, &se reduce the priority of the highest priority wire and start again, and (e) Direct lower priority inputs that are not used for the primary output toward secondary outputs.

2. The system of claim 1 wherein the computer adjusts the input priorities in real time to account for changes depending on system demands.

3. The system of claim 2 wherein the computer is programmable so that two or more of the electrical inputs may be combined to achieve the minimum electricity requirement for the primary output.

4. The system of claim 3 wherein the computer contains computer hardware controlled with a touch screen monitor.

5. The system of claim 1 wherein the electrical inputs are from any of the group of inputs consisting essentially of: electricity streams from solar generated power; wind generated power; power stored in fuel-cells; geothermal generated power; fossil-fuel generated power; steam generated power; or a public utility power grid.

6. The system of claim 1 further comprising a charge output controller that may be configured to deliver direct current or alternating current to the primary output.

7. An energy management system comprising: a plurality of wire(s) coupled respectively to a corresponding plurality of electrical inputs; a wattmeter that is independently circuited to each wire; a gate switch for independently controlling flow of electricity through each wire; and, a computer utilizing programmable algorithms that analyze and direct electrical inputs to primary and secondary outputs;
wherein the computer can identify a priority relationship between the wires;
wherein the computer can identify a minimum electricity requirement for the highest priority wire;
wherein the computer can receive measurements from the wattmeter;
wherein the computer can determine whether the highest priority wire meets the minimum electricity requirement and, if so, control the gate switch to allow electricity to pass through said highest priority wire, else reduce the priority of the highest priority wire and start again.

8. The system of claim 7 wherein the computer can direct lower priority inputs that are not used for the primary output toward secondary outputs.

9. The system of claim 8 wherein the computer adjusts the input priorities in real time to account for changes depending on system demands.

10. The system of claim 9 wherein the computer is programmable so that two or more of the electrical inputs may be combined to achieve the minimum electricity requirement for the primary output.

11. The system of claim 10 wherein the computer er contains computer hardware controlled with a touch screen monitor.

12. A method of controlling multiple input streams of electricity to a local power system comprising the steps of:
coupling a plurality of wire(s)to a corresponding plurality of electrical inputs; connecting a wattmeter that is independently circuited to each wire;
connecting a gate switch for independently controlling flow of electricity through each wire; and, connecting a computer that utilizes programmable algorithms to analyze and direct the electrical inputs to primary and secondary outputs; and
wherein the computer contains computer hardware coupled to computer readable memory with program code configured to: (a) Identify a priority relationship between the wires, (b) Identify a minimum electricity requirement for the highest priority wire, (c) Receive measurements from the wattmeter, (d) Determine whether the highest priority wire meets the minimum electricity requirement and, if so, control the gate switch to allow electricity to pass through said highest priority wire, else reduce the priority of the highest priority wire and start again, and (e) Direct lower priority inputs that are not used for the primary output toward secondary outputs.

13. The method of claim 12 wherein the computer can further be configured to: (a) Adjust the input priorities in real time to account for changes depending on system demands, and (b) combine two or more of the electrical inputs to achieve the minimum electricity requirement for the primary output.

* * * * *